(12) United States Patent
Nakano et al.

(10) Patent No.: US 10,942,294 B2
(45) Date of Patent: Mar. 9, 2021

(54) PROJECTION LENS

(71) Applicant: Konica Minolta, Inc., Tokyo (JP)

(72) Inventors: Yoshihiro Nakano, Tondabayashi (JP); Koji Takahara, Hirakata (JP); Miyuki Teramoto, Osakasayama (JP)

(73) Assignee: Konica Minolta, Inc., Tokyo (JP)

( * ) Notice: Subject to any disclaimer, the term of this patent is extended or adjusted under 35 U.S.C. 154(b) by 226 days.

(21) Appl. No.: 16/303,591

(22) PCT Filed: May 19, 2017

(86) PCT No.: PCT/JP2017/018922
§ 371 (c)(1),
(2) Date: Nov. 20, 2018

(87) PCT Pub. No.: WO2017/204127
PCT Pub. Date: Nov. 30, 2017

(65) Prior Publication Data
US 2020/0319376 A1    Oct. 8, 2020

(30) Foreign Application Priority Data
May 26, 2016 (JP) .............................. JP2016-105391

(51) Int. Cl.
*G02B 21/00*      (2006.01)
*G02B 1/115*      (2015.01)
(Continued)

(52) U.S. Cl.
CPC .......... *G02B 1/115* (2013.01); *C03C 17/3423* (2013.01); *G02B 3/0037* (2013.01); *G02B 3/0087* (2013.01); *G03B 21/14* (2013.01)

(58) Field of Classification Search
CPC .......... G02B 1/11; G02B 1/111; G02B 1/113; G02B 1/115; G02B 3/0037; G02B 3/0087;
(Continued)

(56) References Cited

U.S. PATENT DOCUMENTS

2005/0122576 A1*  6/2005  Yonetani ................ G02B 1/115
                                                                              359/370
2007/0159697 A1*  7/2007  Terayama .......... G02B 27/0012
                                                                              359/586

FOREIGN PATENT DOCUMENTS

CN    203643625 U    6/2014
EP    1808714 A1    7/2007
(Continued)

OTHER PUBLICATIONS

International Search Report for corresponding International Application No. PCT/JP2017/018922, dated Aug. 8, 2017 (5 pages).
(Continued)

*Primary Examiner* — Audrey Y Chang
(74) *Attorney, Agent, or Firm* — Osha Bergman Watanabe & Burton LLP (57) ABSTRACT

A projection lens for projecting an image onto a projection plane includes: a lens substrate; and an antireflective film disposed on a surface of the lens substrate. The antireflective film includes, in order starting from an air side of the antireflective film, a first layer, second layer, third layer, fourth layer, fifth layer, sixth layer, seventh layer, and eighth layer. The first layer is formed of MgF$_2$. Each of the second layer, the fourth layer, the sixth layer, and the eighth layer has a refractive index of 2.0 to 2.3. Each of the third layer, the fifth layer, and the seventh layer is formed of SiO$_2$.

4 Claims, 5 Drawing Sheets

(51) Int. Cl.
*C03C 17/34* (2006.01)
*G02B 3/00* (2006.01)
*G03B 21/14* (2006.01)

(58) Field of Classification Search
CPC .......... G02B 5/28; G02B 13/16; G02B 21/14; G03C 17/3423
USPC .................................................. 359/586, 370
See application file for complete search history.

(56) References Cited

FOREIGN PATENT DOCUMENTS

| | | |
|---|---|---|
| EP | 2708922 A2 | 3/2014 |
| JP | 2002-267803 A | 9/2002 |
| JP | 2007-94150 A | 4/2007 |
| JP | 2010-79013 A | 4/2010 |
| JP | 2014-164120 A | 9/2014 |
| JP | 2015-022187 A | 2/2015 |

OTHER PUBLICATIONS

Written Opinion for corresponding International Application No. PCT/JP2017/018922, dated Aug. 8, 2017 (9 pages).

Office Action issued in corresponding Chinese Patent Application No. CN201780031679.2 dated Nov. 1, 2019, with English translation (16 pages).

Extended European Search Report issued in corresponding European Application No. 17802719.9, dated Apr. 23, 2019 (8 pages).

Notification of Reasons for Refusal issued in corresponding Japanese Patent Application No. 2018-519513, dated Jun. 23, 2020 (6 pages).

* cited by examiner

FIG. 3
COMPARATIVE EXAMPLE

FIG. 4
EXAMPLE 1

FIG. 5

EXAMPLE 2

FIG. 6

EXAMPLE 3

FIG. 7
EXAMPLE 4

FIG. 8
EXAMPLE 5

FIG. 9

PROJECTION LENS

TECHNICAL FIELD

The present invention relates to a projection lens.

BACKGROUND ART

In recent years, imaging performance required for a projection lens has been increased as the number of pixels of a projected image increases, and the number of constituent lenses tends to increase. Regarding this tendency, in a case of a conventional projection lens including 15 lenses each having four antireflective films formed on a surface of a lens substrate having, for example, a refractive index of 1.52, a light reflection loss of about 5% in the entire projection lens is generated on average in a visible light wavelength range. Furthermore, in a case of a projection lens including 30 lenses, there is a concern that a light reflection loss of about 10% is generated, and brightness of an image projected on a projection plane is largely reduced. Therefore, in order to suppress a decrease in the transmittance of the whole system of a projection lens in response to an increase in the number of constituent lenses, an antireflective film with a lower reflectance and a smaller loss of light is required for a lens substrate. An example of conventional technology related to suppressing the decrease in the transmittance is disclosed in Patent Literature 1.

In an antireflective film described in Patent Literature 1, in order from a substrate side, a first layer is formed of a material having a refractive index lower than that of the substrate, second, fourth, sixth, and eighth layers are formed of a high refractive index material, third, fifth, seventh, and ninth layers are formed of a low refractive index material, and the optical film thickness of each of the layers is individually set to a predetermined value related to a design wavelength. This prevents reflection in a wide wavelength band from an ultraviolet region to an infrared region.

PATENT LITERATURE

Patent Literature 1: JP 2002-267803 A

However, according to the conventional technology described in Patent Literature 1, even in an embodiment having the lowest maximum reflectance in a visible light wavelength range (for example, 420 nm to 690 nm), the maximum reflectance is about 0.5%, which is relatively high. As a result, a projection lens is insufficient for application to a recent increase in the number of pixels of an image.

SUMMARY

One or more embodiments of the presents invention provide a projection lens capable of effectively suppressing a decrease in the transmittance of the whole system and capable of coping with an increase in the number of constituent lenses.

One or more embodiments of the present invention provide a projection lens for projecting an image onto a projection plane, including: a lens substrate; and an antireflective film constituted by at least eight layers, formed on a surface of the lens substrate, characterized in that, in the antireflective film, in order from an air side, a first layer is formed of $MgF_2$, each of a second layer, a fourth layer, a sixth layer, and an eighth layer has a refractive index of 2.0 to 2.3, each of a third layer, a fifth layer, and a seventh layer is formed of $SiO_2$, and quarter wave optical thicknesses $Q_1$ to $Q_8$ for the first layer to the eighth layer with respect to a refractive index $n_s$ of the lens substrate at a design main wavelength of $\lambda_0=550$ nm satisfy the following formulas (1) to (8).

$$Q_1=0.05 \times n_s + A1 (0.79 \leq A1 \leq 0.91) \quad \text{Formula (1)}$$

$$Q_2=0.09 \times n_s + A2 (1.64 \leq A2 \leq 1.79) \quad \text{Formula (2)}$$

$$Q_3=0.10 \times n_s + A3 (1.65 \leq A3 \leq 1.90) \quad \text{Formula (3)}$$

$$Q_4=-0.31 \times n_s + A4 (1.01 \leq A4 \leq 1.23) \quad \text{Formula (4)}$$

$$Q_5=A5 (0.10 \leq A5 \leq 0.35) \quad \text{Formula (5)}$$

$$Q_6=0.79 \times n_s + A6 (-1.64 \leq A6 \leq 0.01) \quad \text{Formula (6)}$$

$$Q_7=-0.64 \times n_s + A7 (1.26 \leq A7 \leq 1.55) \quad \text{Formula (7)}$$

$$Q_8=0.32 \times n_s + A8 (-0.38 \leq A8 \leq 0.19) \quad \text{Formula (8)}$$

In addition, the projection lens having the above configuration is characterized in that each of the second layer, the fourth layer, the sixth layer, and the eighth layer is formed of any one of $Ta_2O_5$, $LaTiO_3$, a mixture of $Ti_2O_3$ and $ZrO_2$, and a mixture of $ZrTiO_4$ and $ZrO_2$.

In addition, the projection lens having the above configuration is characterized in that the antireflective film has a maximum reflectance of 0.2% or less in a wavelength range of 430 nm to 670 nm.

In addition, the projection lens having the above configuration is characterized in that three or more types of glass materials among glass materials classified into five types satisfying the following formulas (9) to (13) regarding a refractive index $n_s$ are used as the lens substrate.

$$1.45 \leq n_s < 1.55 \quad \text{Formula (9)}$$

$$1.55 \leq n_s < 1.65 \quad \text{Formula (10)}$$

$$1.65 \leq n_s < 1.75 \quad \text{Formula (11)}$$

$$1.75 \leq n_s < 1.85 \quad \text{Formula (12)}$$

$$1.85 \leq n_s < 1.95 \quad \text{Formula (13)}$$

According to one or more embodiments of the present invention, it is possible to form an antireflective film with a low reflectance and a small loss of light corresponding to lens substrates having various refractive indices. That is, it is possible to form an antireflective film using a high refractive index material which has been relatively difficult to use conventionally, and it is possible to expand the degree of freedom of the configuration of a projection lens. As a result, it is possible to effectively suppress a decrease in the transmittance of the whole system of a projection lens, and it is possible to flexibly cope with an increase in the number of constituent lenses.

DETAILED DESCRIPTION

Hereinafter, embodiments of the present invention will be described with reference to the drawings.

Figure 1:
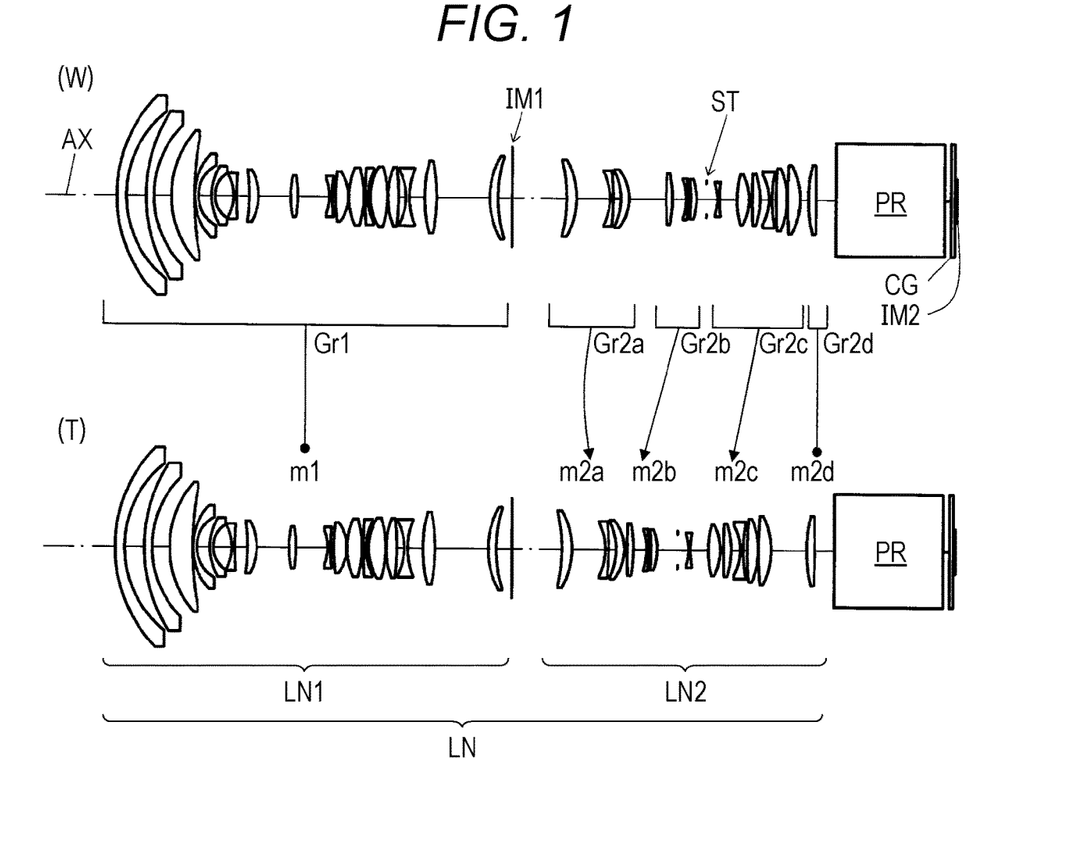
FIG. 1 is an optical configuration diagram of a projection lens according to one or more embodiments of the present invention.

First, the configuration of a projection lens according to one or more embodiments of the present invention will be described with reference to FIG. 1. FIG. 1 is an optical configuration diagram of a projection lens, illustrating the lens cross-sectional shape, the lens arrangement, and the like of a projection lens LN with optical cross sections at each of a wide-angle end (W) and a telephoto end (T). The right side of FIG. 1 is a reduction side of the projection lens LN, and the left side of FIG. 1 is an enlargement side of the projection lens LN. Note that a prism PR (for example, a total internal reflection (TIR) prism or a color separation/synthesis prism) and a cover glass CG of an image display element are illustrated on the reduction side of the projection lens LN.

The projection lens LN is constituted by, for example, 30 lens components as a whole as illustrated in FIG. 1, and includes a first optical system LN1 and a second optical system LN2 in order from the enlargement side with an intermediate image plane IM1 interposed therebetween. The second optical system LN2 forms an intermediate image of an image displayed on an image display surface IM2 of an image display element on the intermediate image plane IM1. The first optical system LN1 enlarges and projects the intermediate image. Note that an aperture stop ST is located near the center of the second optical system LN2 in an optical axis direction. A relay lens is used in order to obtain both a wide field angle and excellent projection performance. Therefore, the number of constituent lenses is large.

Figure 2:
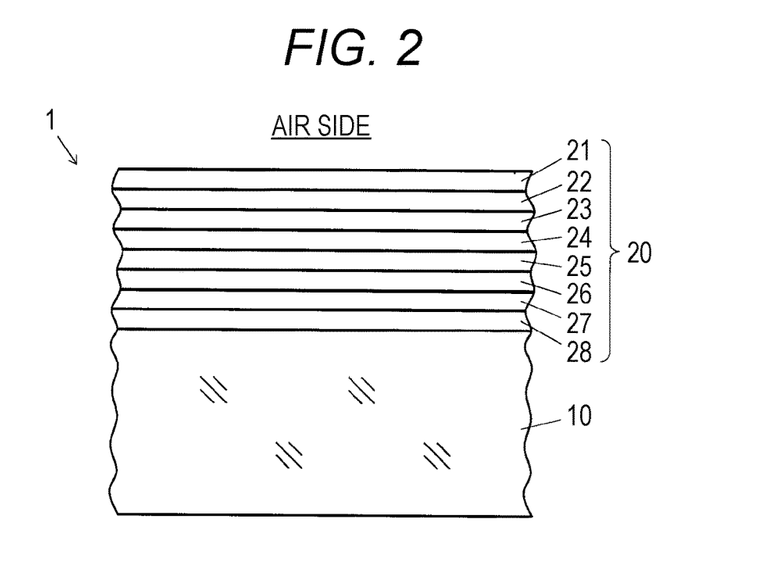
FIG. 2 is a layer configuration diagram of an antireflective film of a single lens of the projection lens according to one or more embodiments of the present invention.

Next, the detailed configuration of a single lens used for the projection lens LN will be described with reference to FIG. 2. FIG. 2 is a layer configuration diagram of an antireflective film of a single lens.

A lens 1 used for the projection lens LN includes a lens substrate 10 and an antireflective film 20 illustrated in FIG. 2. The lens substrate 10 is constituted by a transparent substrate formed of, for example, glass (glass material). On a surface of the lens substrate 10, the antireflective film 20 constituted by eight layers is formed.

The antireflective film 20 includes, in order from an air side, a first layer 21, a second layer 22, a third layer 23, a fourth layer 24, a fifth layer 25, a sixth layer 26, a seventh layer 27, and an eighth layer 28. The first layer 21 is formed of $MgF_2$. Each of the second layer 22, the fourth layer 24, the sixth layer 26, and the eighth layer 28 is formed of a so-called high refractive index material having a refractive index of 2.0 to 2.3. Each of the third layer 23, the fifth layer 25, and the seventh layer 27 is formed of $SiO_2$.

The quarter wave optical thicknesses (QWOT) $Q_1$ to $Q_8$ of the first layer 21 to the eighth layer 28 with respect to a refractive index $n_s$ of the lens substrate 10 at a design main wavelength of $\lambda_0=550$ nm satisfy the following formulas (1) to (8).

$$Q_1=0.05 \times n_s + A1 \quad (0.79 \leq A1 \leq 0.91) \qquad \text{Formula (1)}$$

$$Q_2=0.09 \times n_s + A2 \quad (1.64 \leq A2 \leq 1.79) \qquad \text{Formula (2)}$$

$$Q_3=0.10 \times n_s + A3 \quad (1.65 \leq A3 \leq 1.90) \qquad \text{Formula (3)}$$

$$Q_4=-0.31 \times n_s + A4 \quad (1.01 \leq A4 \leq 1.23) \qquad \text{Formula (4)}$$

$$Q_5=A5 \quad (0.10 \leq A5 \leq 0.35) \qquad \text{Formula (5)}$$

$$Q_6=0.79 \times n_s + A6 \quad (-1.64 \leq A6 \leq 0.01) \qquad \text{Formula (6)}$$

$$Q_7=-0.64 \times n_s + A7 \quad (1.26 \leq A7 \leq 1.55) \qquad \text{Formula (7)}$$

$$Q_8=0.32 \times n_s + A8 \quad (-0.38 \leq A8 \leq 0.19) \qquad \text{Formula (8)}$$

Each of the layers of the antireflective film 20 is formed by a vacuum deposition method under heating, for example, at 300° C. Particularly, the second layer 22 to the eighth layer 28 are formed by a vacuum deposition method using ion assist. Ion-assisted vapor deposition may be used in order to reduce a change in film density of the antireflective film 20 and the roughness of a film surface due to variation of the degree of vacuum and the like in the vacuum deposition method. This makes it possible to suppress occurrence of color unevenness and deterioration of characteristic reproducibility caused by a change in film density, that is, a change in refractive index of a film. When ion-assisted vapor deposition is used for forming the antireflective film 20, it is possible to use a high refractive index material which has been relatively difficult to use conventionally for the layers constituting the antireflective film 20.

According to the above configuration, the antireflective film 20 has a maximum reflectance of 0.2% or less in a wavelength range of 430 nm to 670 nm.

Note that each of the second layer 22, the fourth layer 24, the sixth layer 26, and the eighth layer 28 in the antireflective film 20 may be formed of any one of $Ta_2O_5$, $LaTiO_3$, a mixture of $Ti_2O_3$ and $ZrO_2$, and a mixture of $ZrTiO_4$ and $ZrO_2$.

In each of the 30 lenses of the projection lens LN, three or more types of glass materials having different refractive indexes $n_s$ are used as the lens substrate 10. Specifically, three or more types of glass materials among glass materials classified into five types satisfying the following formulas (9) to (13) regarding a refractive index $n_s$ are used as the lens substrate 10.

$$1.45 \leq n_s < 1.55 \qquad \text{Formula (9)}$$

$$1.55 \leq n_s < 1.65 \qquad \text{Formula (10)}$$

$$1.65 \leq n_s < 1.75 \qquad \text{Formula (11)}$$

$1.75 \leq n_s < 1.85$          Formula (12)

$1.85 \leq n_s < 1.95$          Formula (13)

EXAMPLES

Figure 3:
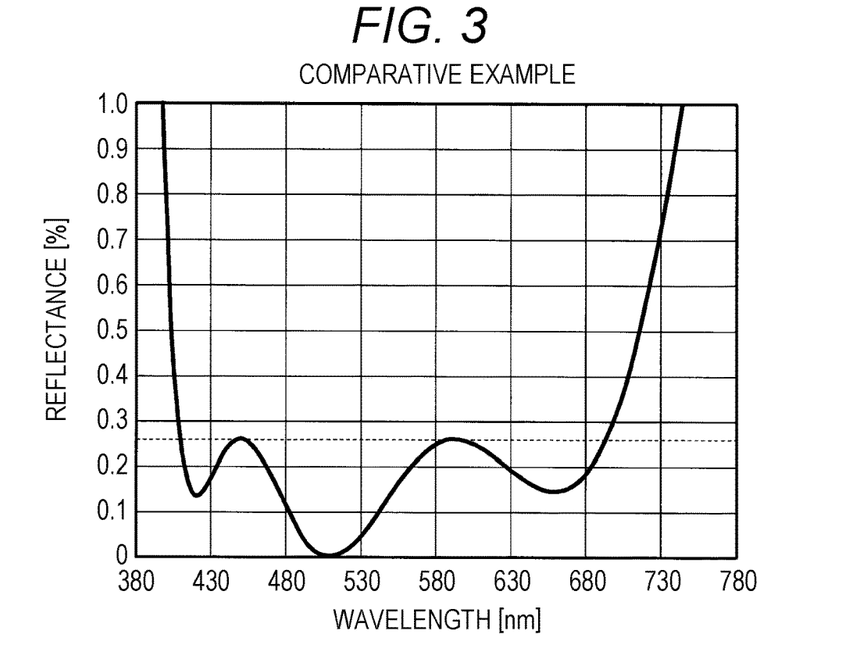
FIG. 3 is a graph illustrating spectral reflectance characteristics of an antireflective film of a lens substrate in Comparative Example with respect to one or more embodiments of the present invention.

Subsequently, in one or more embodiments, evaluation of light reflectance of a lens substrate and an antireflective film in each of Examples and a lens substrate and an antireflective film in Comparative Example will be described with reference to FIGS. 3 to 9. FIG. 3 is a graph illustrating spectral reflectance characteristics of an antireflective film of a lens substrate in Comparative Example. FIGS. 4 to 9 are graphs illustrating spectral reflectance characteristics of antireflective films of lens substrates in Examples 1 to 6. Note that the vertical axis indicates reflectance and the horizontal axis indicates wavelength of light in FIGS. 3 to 9.

Conditions of a glass substrate and an antireflective film in Comparative Example are illustrated in Table 1. In Comparative Example, a general antireflective film constituted by four layers was formed on a surface of a glass lens substrate having a refractive index $n_s=1.52$ at a design main wavelength of $\lambda_0=550$ nm. Each layer of the antireflective film was formed by a vacuum deposition method under heating at 300° C.

TABLE 1

| Comparative Example Design main wavelength $\lambda_0 = 550$ [nm] | | |
|---|---|---|
| Material for layer | | QWOT |
| First layer | MgF$_2$ | 0.93 |
| Second layer | LaTiO$_3$ | 1.86 |
| Third layer | AL$_2$O$_3$ | 1.09 |
| Fourth layer | MgF$_2$ | 0.41 |

Lens substrate Refractive index $n_s$: 1.52

According to FIG. 3 illustrating the spectra reflectance characteristics of the lens substrate and the antireflective film in Comparative Example, a maximum reflectance in a visible light wavelength range of 430 nm to 670 nm was 0.26%. It is found that Comparative Example has a relatively high maximum reflectance.

Figure 4:
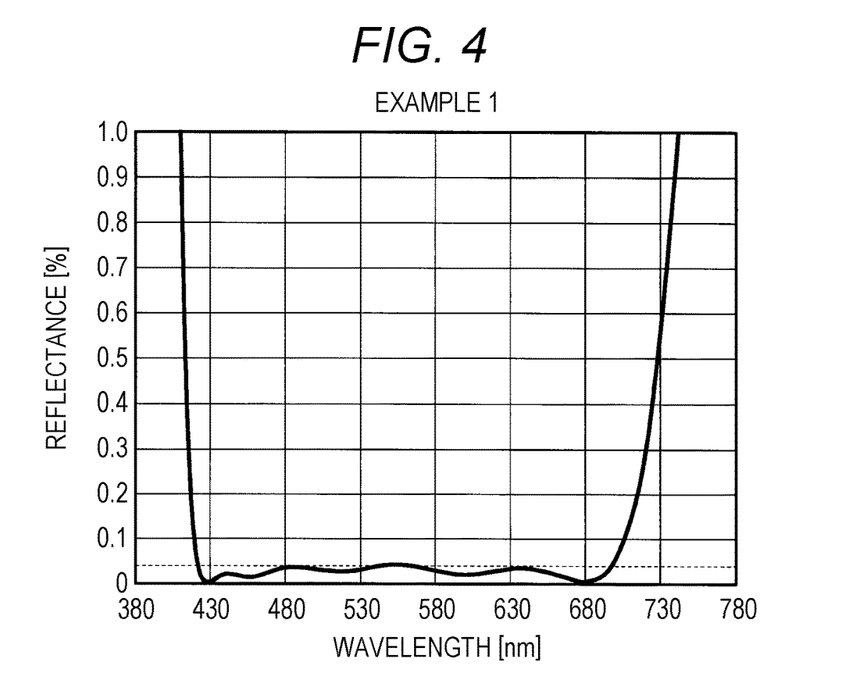
FIG. 4 is a graph illustrating spectral reflectance characteristics of an antireflective film of a lens substrate in Example 1 of the projection lens according to one or more embodiments of the present invention.

Conditions of the glass substrate 10 and the antireflective film 20 in Example 1 are illustrated in Table 2. In Example 1, the antireflective film 20 constituted by eight layers was formed on a surface of the glass lens substrate 10 having a refractive index $n_s=1.52$ at a design main wavelength of $\lambda_0=550$ nm. The quarter wave optical thicknesses (QWOT) $Q_1$ to $Q_8$ of the first layer 21 to the eighth layer 28 with respect to a refractive index $n_s=1.52$ of the lens substrate 10 at a design main wavelength of $\lambda_0=550$ nm satisfy the following formulas (1) to (8). Each layer of the antireflective film 20 was formed by a vacuum deposition method under heating at 300° C. Particularly, the second layer 22 to the eighth layer 28 were formed by a vacuum deposition method using ion assist.

TABLE 2

| Example 1 Design main wavelength $\lambda_0 = 550$ [nm] | | |
|---|---|---|
| Material for layer | | QWOT |
| First layer | MgF$_2$ | $Q_1$ | 0.94 |
| Second layer | Ta$_2$O$_5$ | $Q_2$ | 1.89 |

TABLE 2-continued

| Example 1 Design main wavelength $\lambda_0 = 550$ [nm] | | |
|---|---|---|
| Material for layer | | QWOT |
| Third layer | SiO$_2$ | $Q_3$ | 2.01 |
| Fourth layer | Ta$_2$O$_5$ | $Q_4$ | 0.67 |
| Fifth layer | SiO$_2$ | $Q_5$ | 0.19 |
| Sixth layer | Ta$_2$O$_5$ | $Q_6$ | 0.85 |
| Seventh layer | SiO$_2$ | $Q_7$ | 0.43 |
| Eighth layer | Ta$_2$O$_5$ | $Q_8$ | 0.22 |

Lens substrate Refractive index $n_s$: 1.52

According to FIG. 4 illustrating the spectra reflectance characteristics of the lens substrate 10 and the antireflective film 20 in Example 1, a maximum reflectance in a visible light wavelength range of 430 nm to 670 nm was 0.04%. It is found that the maximum reflectance is suppressed to a very low value in Example 1 as compared with Comparative Example.

Figure 5:
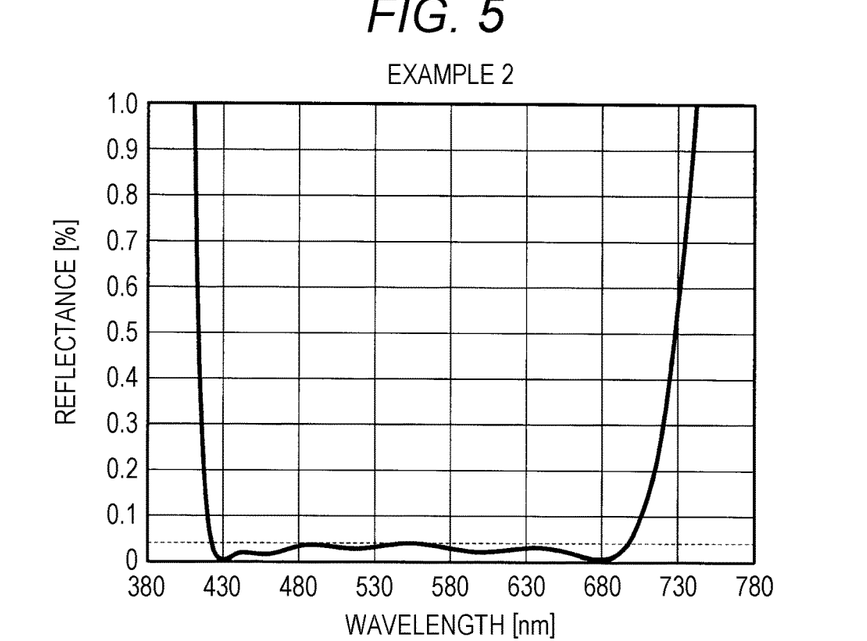
FIG. 5 is a graph illustrating spectral reflectance characteristics of an antireflective film of a lens substrate in Example 2 of the projection lens according to one or more embodiments of the present invention.

Conditions of the glass substrate 10 and the antireflective film 20 in Example 2 are illustrated in Table 3. In Example 2, the antireflective film 20 constituted by eight layers was formed on a surface of the glass lens substrate 10 having a refractive index $n_s=1.62$ at a design main wavelength of $\lambda_0=550$ nm. The quarter wave optical thicknesses (QWOT) $Q_1$ to $Q_8$ of the first layer 21 to the eighth layer 28 with respect to a refractive index $n_s=1.62$ of the lens substrate 10 at a design main wavelength of $\lambda_0=550$ nm satisfy the following formulas (1) to (8). Each layer of the antireflective film 20 was formed by a vacuum deposition method under heating at 300° C. Particularly, the second layer 22 to the eighth layer 28 were formed by a vacuum deposition method using ion assist.

[Table 3]

TABLE 3

| Example 2 Design main wavelength $\lambda_0 = 550$ [nm] | | |
|---|---|---|
| Material for layer | | QWOT |
| First layer | MgF$_2$ | $Q_1$ | 0.95 |
| Second layer | Ta$_2$O$_5$ | $Q_2$ | 1.89 |
| Third layer | SiO$_2$ | $Q_3$ | 1.99 |
| Fourth layer | Ta$_2$O$_5$ | $Q_4$ | 0.66 |
| Fifth layer | SiO$_2$ | $Q_5$ | 0.13 |
| Sixth layer | Ta$_2$O$_5$ | $Q_6$ | 1.07 |
| Seventh layer | SiO$_2$ | $Q_7$ | 0.33 |
| Eighth layer | Ta$_2$O$_5$ | $Q_8$ | 0.26 |

Lens substrate Refractive index $n_s$: 1.62

According to FIG. 5 illustrating the spectral reflectance characteristics of the lens substrate 10 and the antireflective film 20 in Example 2, a maximum reflectance in a visible light wavelength range of 430 nm to 670 nm was 0.04%. It is found that the maximum reflectance is suppressed to a very low value in Example 2 as compared with Comparative Example.

Figure 6:
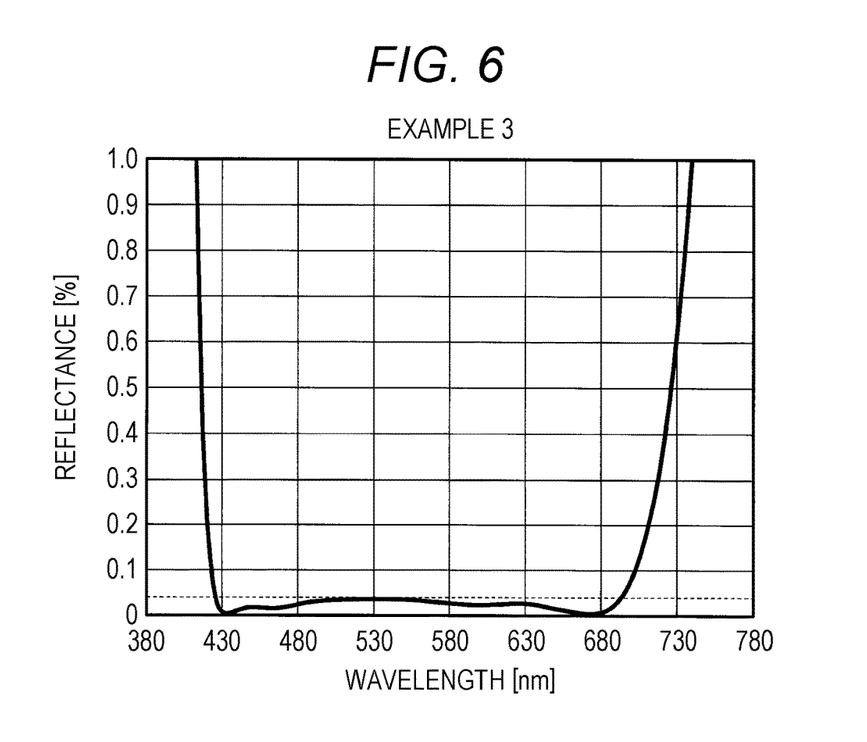
FIG. 6 is a graph illustrating spectral reflectance characteristics of an antireflective film of a lens substrate in Example 3 of the projection lens according to one or more embodiments of the present invention.

Conditions of the glass substrate 10 and the antireflective film 20 in Example 3 are illustrated in Table 4. In Example 3, the antireflective film 20 constituted by eight layers was formed on a surface of the glass lens substrate 10 having a refractive index $n_s=1.72$ at a design main wavelength of $\lambda_0=550$ nm. The quarter wave optical thicknesses (QWOT) $Q_1$ to $Q_8$ of the first layer 21 to the eighth layer 28 with respect to a refractive index $n_s=1.72$ of the lens substrate 10 at a design main wavelength of $\lambda_0=550$ nm satisfy the following formulas (1) to (8). Each layer of the antireflective film 20 was formed by a vacuum deposition method under heating at 300° C. Particularly, the second layer 22 to the eighth layer 28 were formed by a vacuum deposition method using ion assist.

TABLE 4

Example 3
Design main wavelength $\lambda_0$ = 550 [nm]

| Material for layer | | QWOT | |
|---|---|---|---|
| First layer | MgF$_2$ | Q$_1$ | 0.95 |
| Second layer | Ta$_2$O$_5$ | Q$_2$ | 1.90 |
| Third layer | SiO$_2$ | Q$_3$ | 1.99 |
| Fourth layer | Ta$_2$O$_5$ | Q$_4$ | 0.63 |
| Fifth layer | SiO$_2$ | Q$_5$ | 0.13 |
| Sixth layer | Ta$_2$O$_5$ | Q$_6$ | 1.14 |
| Seventh layer | SiO$_2$ | Q$_7$ | 0.27 |
| Eighth layer | Ta$_2$O$_5$ | Q$_8$ | 0.29 |

Lens substrate Refractive index $n_s$: 1.72

According to FIG. 6 illustrating the spectral reflectance characteristics of the lens substrate 10 and the antireflective film 20 in Example 3, a maximum reflectance in a visible light wavelength range of 430 nm to 670 nm was 0.04%. It is found that the maximum reflectance is suppressed to a very low value in Example 3 as compared with Comparative Example.

Figure 7:
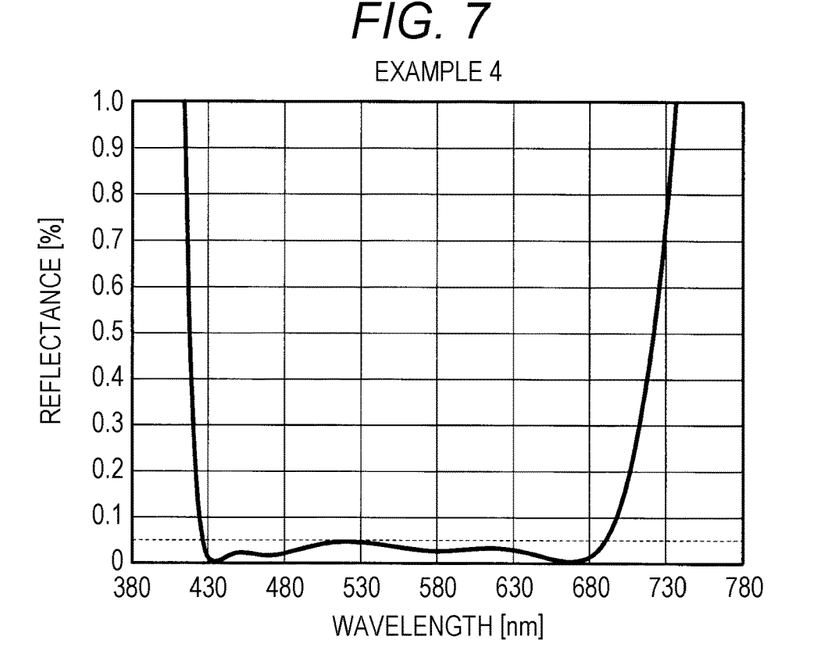
FIG. 7 is a graph illustrating spectral reflectance characteristics of an antireflective film of a lens substrate in Example 4 of the projection lens according to one or more embodiments of the present invention.

Conditions of the glass substrate 10 and the antireflective film 20 in Example 4 are illustrated in Table 5. In Example 4, the antireflective film 20 constituted by eight layers was formed on a surface of the glass lens substrate 10 having a refractive index $n_s$=1.82 at a design main wavelength of $\lambda_0$=550 nm. The quarter wave optical thicknesses (QWOT) $Q_1$ to $Q_8$ of the first layer 21 to the eighth layer 28 with respect to a refractive index $n_s$=1.82 of the lens substrate 10 at a design main wavelength of $\lambda_0$=550 nm satisfy the following formulas (1) to (8). Each layer of the antireflective film 20 was formed by a vacuum deposition method under heating at 300° C. Particularly, the second layer 22 to the eighth layer 28 were formed by a vacuum deposition method using ion assist.

TABLE 5

Example 4
Design main wavelength $\lambda_0$ = 550 [nm]

| Material for layer | | QWOT | |
|---|---|---|---|
| First layer | MgF$_2$ | Q$_1$ | 0.95 |
| Second layer | Ta$_2$O$_5$ | Q$_2$ | 1.90 |
| Third layer | SiO$_2$ | Q$_3$ | 1.99 |
| Fourth layer | Ta$_2$O$_5$ | Q$_4$ | 0.60 |
| Fifth layer | SiO$_2$ | Q$_5$ | 0.13 |
| Sixth layer | Ta$_2$O$_5$ | Q$_6$ | 1.23 |
| Seventh layer | SiO$_2$ | Q$_7$ | 0.22 |
| Eighth layer | Ta$_2$O$_5$ | Q$_8$ | 0.32 |

Lens substrate Refractive index $n_s$: 1.82

According to FIG. 7 illustrating the spectral reflectance characteristics of the lens substrate 10 and the antireflective film 20 in Example 4, a maximum reflectance in a visible light wavelength range of 430 nm to 670 nm was 0.05%. It is found that the maximum reflectance is suppressed to a very low value in Example 4 as compared with Comparative Example.

Figure 8:
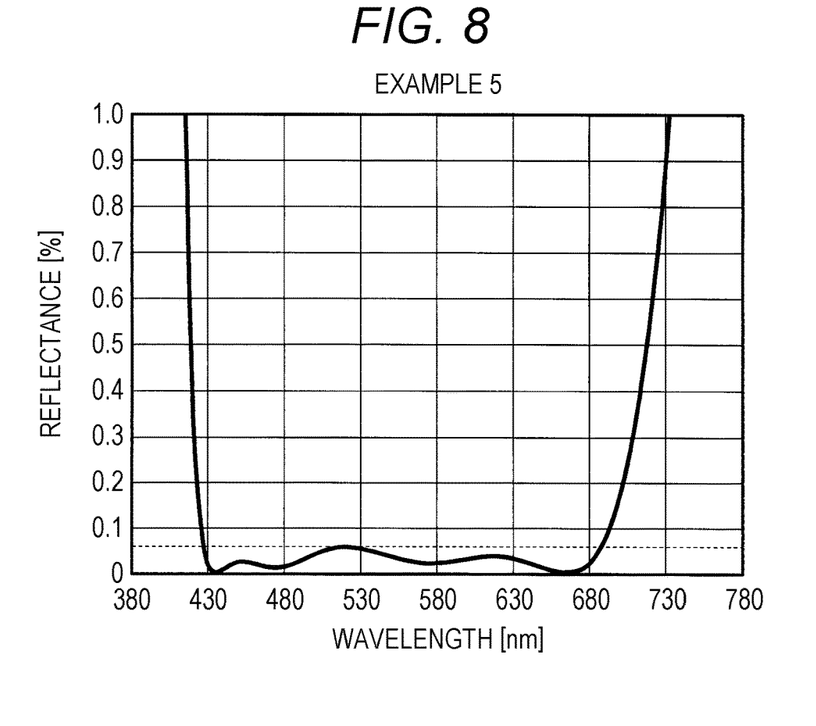
FIG. 8 is a graph illustrating spectral reflectance characteristics of an antireflective film of a lens substrate in Example 5 of the projection lens according to one or more embodiments of the present invention.

Conditions of the glass substrate 10 and the antireflective film 20 in Example 5 are illustrated in Table 6. In Example 5, the antireflective film 20 constituted by eight layers was formed on a surface of the glass lens substrate 10 having a refractive index $n_s$=1.92 at a design main wavelength of =550 nm. The quarter wave optical thicknesses (QWOT) $Q_1$ to $Q_8$ of the first layer 21 to the eighth layer 28 with respect to a refractive index $n_s$=1.92 of the lens substrate 10 at a design main wavelength of $\lambda_0$=550 nm satisfy the following formulas (1) to (8). Each layer of the antireflective film 20 was formed by a vacuum deposition method under heating at 300° C. Particularly, the second layer 22 to the eighth layer 28 were formed by a vacuum deposition method using ion assist.

TABLE 6

Example 5
Design main wavelength $\lambda_0$ = 550 [nm]

| Material for layer | | QWOT | |
|---|---|---|---|
| First layer | MgF$_2$ | Q$_1$ | 0.95 |
| Second layer | Ta$_2$O$_5$ | Q$_2$ | 1.90 |
| Third layer | SiO$_2$ | Q$_3$ | 1.99 |
| Fourth layer | Ta$_2$O$_5$ | Q$_4$ | 0.57 |
| Fifth layer | SiO$_2$ | Q$_5$ | 0.13 |
| Sixth layer | Ta$_2$O$_5$ | Q$_6$ | 1.32 |
| Seventh layer | SiO$_2$ | Q$_7$ | 0.17 |
| Eighth layer | Ta$_2$O$_5$ | Q$_8$ | 0.34 |

Lens substrate Refractive index $n_s$: 1.92

According to FIG. 8 illustrating the spectral reflectance characteristics of the lens substrate 10 and the antireflective film 20 in Example 5, a maximum reflectance in a visible light wavelength range of 430 nm to 670 nm was 0.06%. It is found that the maximum reflectance is suppressed to a very low value in Example 5 as compared with Comparative Example.

Figure 9:
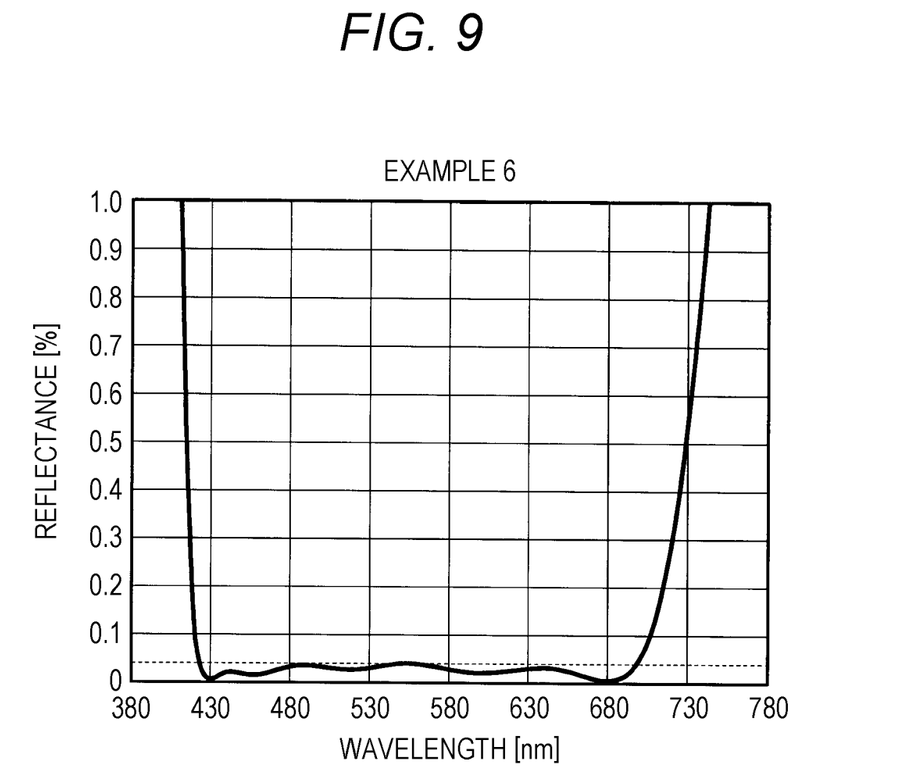
FIG. 9 is a graph illustrating spectral reflectance characteristics of an antireflective film of a lens substrate in Example 6 of the projection lens according to one or more embodiments of the present invention.

Conditions of the glass substrate 10 and the antireflective film 20 in Example 6 are illustrated in Table 7. In Example 6, the antireflective film 20 constituted by nine layers was formed on a surface of the glass lens substrate 10 having a refractive index $n_s$=1.62 at a design main wavelength of $\lambda_0$=550 nm. The quarter wave optical thicknesses (QWOT) $Q_1$ to $Q_8$ of the first layer 21 to the eighth layer 28 with respect to a refractive index $n_s$=1.62 of the lens substrate 10 at a design main wavelength of $\lambda_0$=550 nm satisfy the following formulas (1) to (8). Each layer of the antireflective film 20 was formed by a vacuum deposition method under heating at 300° C. Particularly, the second layer 22 to the eighth layer 28 were formed by a vacuum deposition method using ion assist.

TABLE 7

Example 6
Design main wavelength $\lambda_0$ = 550 [nm]

| Material for layer | | QWOT | |
|---|---|---|---|
| First layer | MgF$_2$ | Q$_1$ | 0.94 |
| Second layer | Ta$_2$O$_5$ | Q$_2$ | 1.89 |
| Third layer | SiO$_2$ | Q$_3$ | 1.98 |
| Fourth layer | Ta$_2$O$_5$ | Q$_4$ | 0.67 |
| Fifth layer | SiO$_2$ | Q$_5$ | 0.13 |
| Sixth layer | Ta$_2$O$_5$ | Q$_6$ | 1.07 |
| Seventh layer | SiO$_2$ | Q$_7$ | 0.33 |
| Eighth layer | Ta$_2$O$_5$ | Q$_8$ | 0.26 |
| Ninth layer | Al$_2$O$_3$ | Q$_9$ | 0.14 |

Lens substrate Refractive index $n_s$: 1.62

According to FIG. 9 illustrating the spectral reflectance characteristics of the lens substrate 10 and the antireflective film 20 in Example 6, a maximum reflectance in a visible light wavelength range of 430 nm to 670 nm was 0.04%. It is found that the maximum reflectance is suppressed to a very low value in Example 6 as compared with Comparative Example.

In this way, according to the configuration of one or more embodiments, it is possible to form the antireflective film 20 with a low reflectance and a small loss of light corresponding to the lens substrates 10 having various refractive indices. That is, it is possible to form the antireflective film 20 using a high refractive index material which has been relatively difficult to use conventionally, and it is possible to expand the degree of freedom of the configuration of the projection lens LN. As a result, it is possible to effectively suppress a decrease in the transmittance of the whole system of the projection lens LN, and it is possible to flexibly cope with an increase in the number of constituent lenses.

Furthermore, in the antireflective film 20, each of the second layer 22, the fourth layer 24, the sixth layer 26, and the eighth layer 28 is formed of any one of $Ta_2O_5$, $LaTiO_3$, a mixture of $Ti_2O_3$ and $ZrO_2$, and a mixture of $ZrTiO_4$ and $ZrO_2$. Therefore, it is possible to form the antireflective film 20 with a small loss of light by a vacuum deposition method under a relatively high temperature environment of, for example, 300° C. There is a risk that practical strength may be lowered in a case where $MgF_2$ used in the first layer 21 is formed in a low temperature environment. Therefore, according to the configuration of one or more embodiments, it is possible to increase the strength of the first layer 21.

The antireflective film 20 may have a maximum reflectance of 0.2% or less in a wavelength range of 430 nm to 670 nm. This makes it possible to obtain the antireflective film 20 sufficient for application to a recent increase in the number of pixels of an image in the projection lens LN.

In addition, three or more types of glass materials among glass materials classified into five types satisfying the above formulas (9) to (13) regarding a refractive index $n_s$ are used as the lens substrate 10. Therefore, even with the projection lens LN obtained by combining the lens substrates 10 formed of various glass materials for thirty lenses, it is possible to form the antireflective film 20 with a low reflectance and a small loss of light. This makes it possible to further widen the degree of freedom of the configuration of the projection lens LN.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

The present invention can be used in a projection lens.

REFERENCE SIGNS LIST

1 Glass
10 Glass substrate
20 Antireflective film
21 First layer
22 Second layer
23 Third layer
24 Fourth layer
Fifth layer
26 Sixth layer
27 Seventh layer
28 Eighth layer
LN Projection lens

The invention claimed is:

1. A projection lens for projecting an image onto a projection plane, comprising:
a lens substrate; and
an antireflective film disposed on a surface of the lens substrate,
wherein:
the antireflective film comprises, in order starting from an air side of the antireflective film, a first layer, second layer, third layer, fourth layer, fifth layer, sixth layer, seventh layer, and eighth layer,
the first layer of the antireflective film is formed of $MgF_2$,
each of the second layer, the fourth layer, the sixth layer, and the eighth layer has a refractive index of 2.0 to 2.3,
each of the third layer, the fifth layer, and the seventh layer is formed of $SiO_2$,
quarter wave optical thicknesses of the first layer to the eighth layer satisfy formulas (1) to (8) below:

$$Q_1 = 0.05 \times n_s + A1 (0.79 \leq A1 \leq 0.91); \tag{1}$$

$$Q_2 = 0.09 \times n_s + A2 (1.64 \leq A2 \leq 1.79); \tag{2}$$

$$Q_3 = 0.10 \times n_s + A3 (1.65 \leq A3 \leq 1.90); \tag{3}$$

$$Q_4 = -0.31 \times n_s + A4 (1.01 \leq A4 \leq 1.23); \tag{4}$$

$$Q_5 = A5 (0.10 \leq A5 \leq 0.35); \tag{5}$$

$$Q_6 = 0.79 \times n_s + A6 (-1.64 \leq A6 \leq 0.01); \tag{6}$$

$$Q_7 = -0.64 \times n_s + A7 (1.26 \leq A7 \leq 1.55); \text{ and} \tag{7}$$

$$Q_8 = 0.32 \times n_s + A8 (-0.38 \leq A8 \leq 0.19), \tag{8}$$

where $Q_1$ to $Q_8$ are quarter wave optical thicknesses of the first layer to the eighth layer, respectively, and $n_s$ is a refractive index of the lens substrate at a wavelength of $\lambda_0 = 550$ nm, and
a maximum reflectance of the antireflective film is less than or equal to 0.2% in a wavelength range of 430 nm to 670 nm.

2. The projection lens according to claim 1, wherein each of the second layer, the fourth layer, the sixth layer, and the eighth layer is formed of any one of $Ta_2O_5$, $LaTiO_3$, a mixture of $Ti_2O_3$ and $ZrO_2$, or a mixture of $ZrTiO_4$ and $ZrO_2$.

3. The projection lens according to claim 2, wherein the lens substrate comprises three glass materials among glass materials satisfying formulas (9) to (13) below:

$$1.45 \leq n_{s9} < 1.55; \tag{9}$$

$$1.55 \leq n_{s10} < 1.65; \tag{10}$$

$$1.65 \leq n_{s11} < 1.75; \tag{11}$$

$$1.75 \leq n_{s12} < 1.85; \text{ and} \tag{12}$$

$$1.85 \leq n_{s13} < 1.95, \tag{13}$$

where $n_{s9}$ to $n_{s13}$ are refractive indices of the glass materials satisfying formulas (9) to (13), respectively.

4. The projection lens according to claim 1, wherein the lens substrate comprises three glass materials among glass materials satisfying formulas (9) to (13) below:

$$1.45 \leq n_{s9} < 1.55; \tag{9}$$

$$1.55 \leq n_{s10} < 1.65; \tag{10}$$

$$1.65 < n_{s11} < 1.75; \tag{11}$$

$1.75 < n_{s12} < 1.85$; and (12)

$1.85 < n_{s13} < 1.95$, (13)

where $n_{s9}$ to $n_{s13}$ are refractive indices of the glass materials satisfying formulas (9) to (13), respectively.

* * * * *